Figures 1, 2:
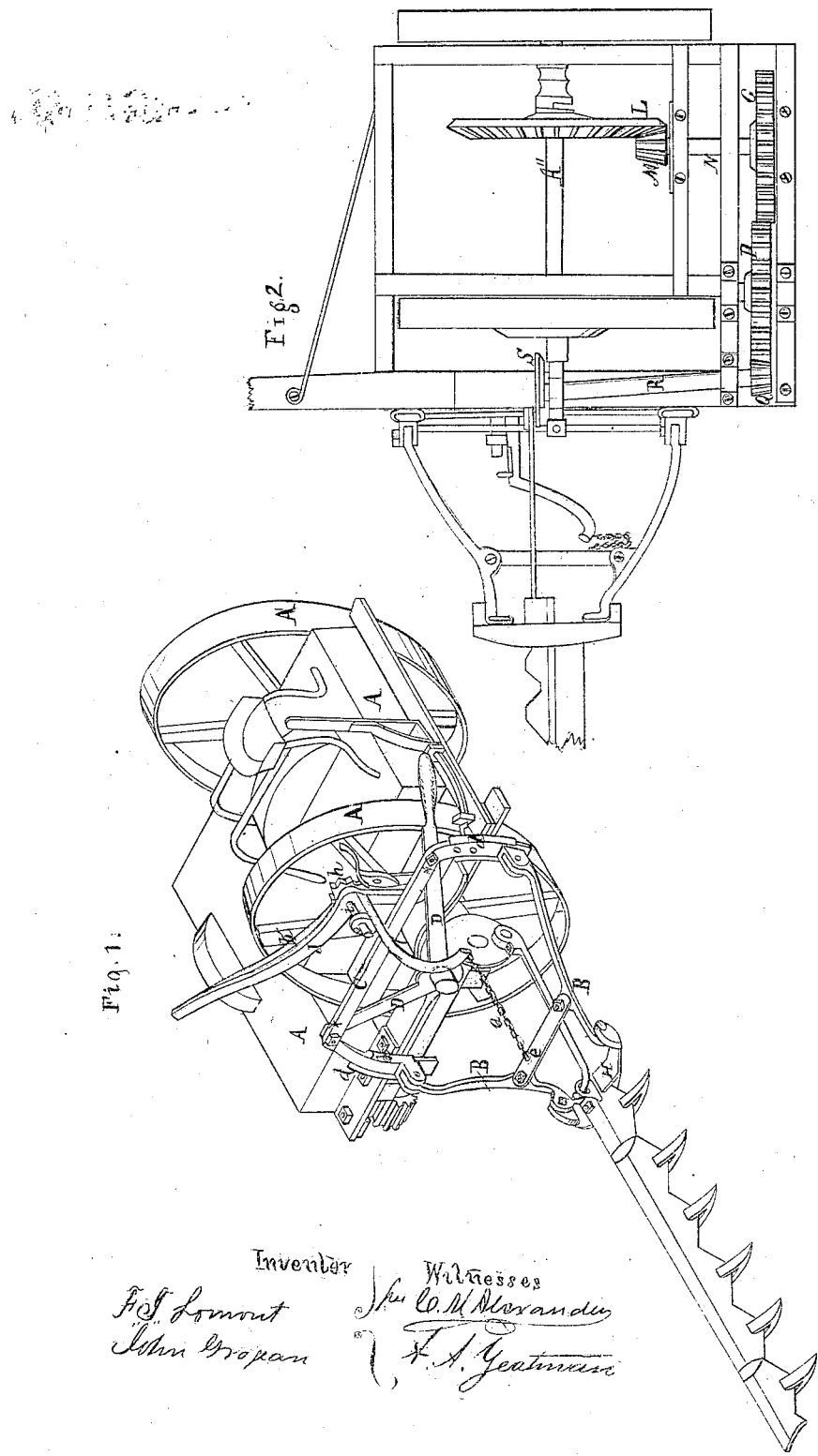

Lomont & Grojean,
Mower.

No. 27641.

Patented Mar. 27, 1860.

Inventor
F. J. Lomont
John Grojean

Witnesses

UNITED STATES PATENT OFFICE.

F. T. LOMONT AND JOHN GROJEAN, OF MASSILLON, OHIO.

IMPROVEMENT IN REAPING AND MOWING MACHINES.

Specification forming part of Letters Patent No. 27,641, dated March 27, 1860.

*To all whom it may concern:*

Be it known that we, F. T. LOMONT and JOHN GROJEAN, of Massillon, in the county of Stark and State of Ohio, have invented certain new and useful Improvements in Reaping and Mowing Machines; and we do hereby declare that the following is a full, clear, and exact description of the same, reference being had to the accompanying drawings, and to the letters of reference marked thereon.

The nature of our invention consists in the arrangement of those parts together which will be hereinafter particularly described.

In the annexed drawings, Figure 1 represents a perspective view. Fig. 2 represents a bottom view.

In the figures, A represents the frame of the machine, which may be made in any convenient and suitable manner. This frame is supported by means of two wheels, A' A', which are secured upon an axle, A''. Upon the axle A'' is also secured a bevel-wheel, L, which works into a bevel-pinion, M, secured upon one end of a shaft, N. Upon the other end of shaft N is secured a gear-wheel, O, which works into an idle-wheel, P, said idle-wheel working into a pinion, Q, secured upon a shaft, R. To one end of shaft R is secured a disk or wheel, which has a pin on one face, near its periphery, to which one end of a pitman is attached, the other end of said pitman being attached to the cutter-bar. By means of these various connections the cutter-bar is driven with proper speed from the main axle A''. The cutter-bar may be driven by this arrangement of wheels, or it may be driven by a simpler and more easy connection of wheels, or in any desired manner, as this forms no part of our invention.

H represents the shoe, which is hinged to the braces B B at front and rear, as is fully represented in the drawings. The braces B B are secured and hinged at their other ends to a curved or arched bar, C. This bar C is so curved and constructed at its ends that it slides in dovetailed grooves in boxes *d d*, which are secured to a beam forming a portion of the frame of the machine.

D represents an angular bar, through which the axle A'' passes, and serves as a fulcrum for said bar when it acts as a lever, and also as a support to the bar. The bar D is secured to the bar C at two points, as seen at *x x*, said bar D being provided with a handle by means of which the operator may change its position, and consequently the position of the curved bar C, thus giving any desired inclination or set to the cutter-bar, finger-bar, &c.

The braces B B are connected together by means of a cross-piece, *e*. To this cross-piece *e* is secured one end of a cord or chain, *a*, the other end of said cord or chain being attached to one end of a lever, J. A small shaft, *i*, passes through the lever J and forms a fulcrum on which it turns. *h* represents a ratchet-wheel, which is secured upon the shaft *i* permanently. *k* represents a bar, which is secured to lever J by means of a spring. One end of this bar catches between the teeth on the wheel *h*, and thus serves to hold the said lever in any desired position. By bearing down the lever J the cord *a* draws the cutting apparatus up from the ground, so as either to regulate the height of cut or to raise it above obstacles in removing it from one point to another.

By means of the bars D and C the cutting apparatus may be inclined up or down for mowing or reaping, or for adapting it to uneven ground, just as circumstances may require.

I am aware that the cutting apparatus of the harvester has been hinged to the coupling-arms, which are in turn hinged to the main frame; also, that the hinged cutting apparatus has been suspended upon the main shaft of the driving-wheels, so as to be capable of adjustment thereon. These features we do not claim; but What we do claim, and desire to secure by Letters Patent, is—

The arrangement of the hinged frame, consisting of braces B B and cross-piece *e*, in combination with segmental adjustable frame C, levers D and J, and chain *a*, all the parts constructed and applied in the manner and for the purpose specified.

F. T. LOMONT.
JOHN GROJEAN.

Witnesses:
THOS. BLACKBURN,
GEORGE CARNE.